United States Patent
Loboz et al.

(10) Patent No.: US 7,430,557 B1
(45) Date of Patent: Sep. 30, 2008

(54) SYSTEM AND METHOD FOR IMPROVING DATABASE REORGANIZATION TIME

(75) Inventors: Charles Zdzislaw Loboz, West Ryde (AU); Jonatan Kelu, Granville (AU)

(73) Assignee: Unisys Corporation, Blue Bell, PA (US)

( * ) Notice: Subject to any disclaimer, the term of this patent is extended or adjusted under 35 U.S.C. 154(b) by 460 days.

(21) Appl. No.: 10/391,959

(22) Filed: Mar. 19, 2003

(51) Int. Cl.
*G06F 17/00* (2006.01)

(52) U.S. Cl. ............... 707/101; 102/102; 102/103 Y; 102/104.1

(58) Field of Classification Search ............ 707/1, 707/4, 9, 102, 200, 202, 204, 10, 104, 3, 707/101, 103 R, 103 Y, 104.1; 709/102; 705/37, 7, 8; 701/200, 201; 600/407; 386/46
See application file for complete search history.

(56) References Cited

U.S. PATENT DOCUMENTS

| | | | | |
|---|---|---|---|---|
| 5,740,801 | A * | 4/1998 | Branson | 600/407 |
| 5,918,219 | A * | 6/1999 | Isherwood | 705/37 |
| 5,948,040 | A * | 9/1999 | DeLorme et al. | 701/201 |
| 6,049,776 | A * | 4/2000 | Donnelly et al. | 705/8 |
| 6,411,964 | B1 * | 6/2002 | Iyer et al. | 707/200 |
| 6,519,613 | B1 * | 2/2003 | Friske et al. | 707/202 |
| 6,915,296 | B2 * | 7/2005 | Parson | 707/4 |
| 7,110,995 | B2 * | 9/2006 | Kirkland | 707/3 |
| 2001/0018690 | A1 * | 8/2001 | Tung et al. | 707/103 Y |
| 2001/0029425 | A1 * | 10/2001 | Myr | 701/200 |
| 2002/0191954 | A1 * | 12/2002 | Beach et al. | 386/46 |
| 2003/0028502 | A1 * | 2/2003 | Lambert et al. | 707/1 |
| 2003/0088505 | A1 * | 5/2003 | Beghtel et al. | 709/102 |
| 2003/0110153 | A1 * | 6/2003 | Shee | 707/1 |
| 2003/0135478 | A1 * | 7/2003 | Marshall et al. | 707/1 |
| 2003/0163469 | A1 * | 8/2003 | Garth et al. | 707/9 |
| 2004/0049415 | A1 * | 3/2004 | Liou et al. | 705/7 |
| 2004/0078398 | A1 * | 4/2004 | Chiang et al. | 707/204 |
| 2004/0260668 | A1 * | 12/2004 | Bradford | 707/1 |

OTHER PUBLICATIONS

Anindya Datta, "Broadcast Protocols to Support Efficient Retrieval from Databases by Mobile Users", ACM, 1999, pp. 1-79.*
Haim Mendelson et al., "Optional Policies for Database Reorganization", Operations Research, Feb. 1981, pp. 23-36.*

* cited by examiner

*Primary Examiner*—Thuy N Pardo
(74) *Attorney, Agent, or Firm*—Alfred W. Kozak; Robert P. Marley; Griffith Hack

(57) ABSTRACT

The invention provides a system and method for the reorganization of a database in a computing system. The method includes determining operations necessary to effect the reorganization of the database, estimating the completion time for the operations, and scheduling operations to be executed in the order of decreasing estimated completion time.

4 Claims, 3 Drawing Sheets

SYSTEM AND METHOD FOR IMPROVING DATABASE REORGANIZATION TIME

FIELD OF THE INVENTION

The present invention relates to a system and method to effect the reorganisation of a database, and specifically, but not exclusively, to a system and method for reducing the time required to reorganise a database.

BACKGROUND OF THE INVENTION

Application software designed to implement business systems can be described as having three tiers or elements. The application software generally comprises a database, to store relevant business data, a business logic/transaction management module, which carries out appropriate manipulation of the data contained in the database, and a user interface, through which a user can interact with the software application.

It will be understood that the word "database", in the present context, denotes any type of persistent store, such as, for example, a relational database, a hierarchical database, an object oriented database, or a file system.

A number of so-called "fourth generation" programming languages have been developed to assist in the creation of business application software. Such fourth generation languages are characterised, in part, by the ability to generate appropriate database layouts, transaction handling routines and user interfaces when provided with an abstract input structure. That is, a fourth generation programming language allows a user to describe their business logic (business rules) in general abstract terms, and from these business rules, all appropriate software code, database structures and user interfaces are generated by the language. In other words, the database layout, software code and user interface is derived from a high level and abstract description. The user does not specify the final structure explicitly.

In the present context, the term "user" refers to a software architect or developer, and/or a system administrator of the aforementioned business application software. A "user" in this context does not refer to end-users of the final software application, such as bank tellers performing transactions from their terminals.

A user of the business application software perceives a fourth generation language as a set of abstract entities, not as a set of database and business logic implementation artifacts. This high-level view relieves the user from the need to address irrelevant (from the user's point of view) details such as, for example, the database table layout and properties, the details of a given database administration, etc.

One example of a fourth generation programming language is the Enterprise Application Environment (EAE), which is developed by Unisys (a corporation with headquarters in Blue Bell, Pa.). In EAE, the user (i.e. the software developer) deals with concepts such as "Ispecs" and "Events"

Ispecs and Events are abstract entities in EAE. "Ispec" is shorthand for "Interface Specification". An user's system is made up of one or more Ispecs. Each Ispec can be either an "Input" Ispec, or an "Output" Ispec, or an "Input/Output" Ispec. An Input Ispec contains a user interface, but no persistent data. An Output Ispec contains persistent data, but no user interface. An Input/Output Ispec contains both a user interface and persistent data. A user creates an application system by creating Ispecs to perform various functions.

For example, if the application requires a menu (for example, a banking application may have a menu such as, "View Account Details; Transfer Funds; Pay Bills") the menu has no persistent data associated with it, so it will be represented as an Input Ispec. On the other hand, a person's bank account will have persistent data, such as the current account balance, and the history of account transactions, but will not have a user interface.

Thus, a bank account would be better represented as an Output Ispec. The same banking application may have a form that requires input from an end user to transfer money between accounts. The form is a user interface, but the data entered (such as the account from which to transfer the money, the account to which to transfer the money, and the amount of money to transfer) needs to be stored persistently, so the form would best be represented as an Input/Output Ispec.

Thus, Ispecs are abstract entities with certain well-defined properties and behaviours in terms of which a user can design an application, which abstracts away the low-level details of how these entities are implemented in the software. This allows the user to specify the system in terms of Ispecs, and then for the application software to be generated from this description.

An "Event" a particular type of Ispec that is intended for use in keeping track of a chronology of events, such as a history of transactions.

Due to normal business dynamics, users of business applications may frequently want to change the contents of their abstract entities. For example, an ISPEC (entity type) called CUSTOMER might have been initially declared as containing just one address. After the application containing this entity has been in use for some time, business needs may dictate an addition to the entity CUSTOMER of more addresses and phone numbers. It is also possible that the type and role of some data items may change.

For example, a banking application which is migrated from one country to another (say from the UK to Turkey) may require larger decimal numbers to express prices. Frequently, more complicated changes are required—new abstract entities may be added to the application software (like SPECIAL-CUSTOMER) and some of the new entities may reference existing entities.

In addition, a rethink of an organisation's business rules or a business reorganization may result in the requirement to split and reorganize existing entities into different structures. A change to an existing and working application is easily incorporated by applications such as EAE. The change merely requires the user to change the description of the abstract entity, and EAE subsequently generates a new database schema and new terminal screen layouts. This is in strong contrast to traditional applications where such changes have to be implemented 'by hand', which leads to extremely complex and error-prone modifications.

However, the mere generation of a new database schema after changes to the business rules does not complete the change process. An old database with old style data and an old style structure already exists. Therefore, a transformation of the data from the old-style database into a new-style database is required.

The modification of the existing database, to satisfy changes required by business dynamics, is a crucial operation affecting a customer's business. This operation, termed "database reorganisation", potentially changes the format and the dependency structure of database information.

In other words, a database reorganisation is a set of all operations that are performed on the database to convert the database structure and data contents from an old schema to a new schema. This may include changes to column types and sizes, changes in the number of columns in a table, the creation of new tables, the removal of existing tables, the transformation of the content of existing tables, and the creation and/or modification of additional administrative information (indexes, permissions, etc). In practice, the database reorganisation may vary from trivial (a change in one column of one table) to complex (a change in dozens or hundreds of tables).

Any reorganisation must preserve the existing database data, as the end user may have collected years of business records.

Therefore, the first crucial requirement of the database reorganisation process is its logical consistency and data preservation.

The second, operational requirement of database reorganisation is the minimisation of "downtime" (i.e. the time during which the application and the database cannot be accessed or used by end users). While changes are made to the database, end users are prevented from the database (i.e. they are locked out), to avoid the introduction of inconsistencies into the data. In many production systems, downtime may be a number of hours, or even a number of days, which is generally deemed to be unacceptable. The long downtime is generally due to the fact that the database is large and contains many linked or associated elements—changing a column in just one table may appear to be a one-line operation, but the change may affect gigabytes of data. The situation is compounded when more significant changes, related to dependencies between abstract entities, are made. Therefore, it is desirable to minimise the amount of time taken to reorganise a database.

There are a number of known standard approaches to the reduction of database reorganisation time. The known approaches rely primarily on logical analysis to reduce the number and complexity of required operations. A number of "rules of thumb" are employed. For example, it is acknowledged that there is no need to modify tables that do not need modification.

In some applications, however, to simplify the programming required, no "rules of thumb" are employed, and the entire contents of the database are simply deleted and then recreated.

Neither approach is entirely satisfactory.

SUMMARY OF INVENTION

In a first aspect, the present invention provides a method for the reorganisation of a database in a computing system, comprising the steps of, determining a plurality of operations necessary to effect the reorganisation of the database, estimating the completion time for each one of the plurality of operations, and scheduling each one of the operations to be executed in the order of decreasing estimated completion time.

Preferably, the step of estimating the completion time for each one of the operations comprises the steps of determining the number of data elements within the database, and deriving a proportional relationship between the number of data elements that must be reorganised and the total time required to complete the operation.

In one embodiment, this is done by estimating the time required by each operation to be proportional to the number of rows in the affected table.

In a second aspect, the present invention provides a system for the reorganisation of a database in a computing system, comprising, means for determining a plurality of operations necessary to effect the reorganisation of the database, means for estimating the completion time for each one of the plurality of operations, and means for scheduling each one of the operations to be executed in the order of decreasing estimated completion time.

An advantage of the present invention is that it preferably reduces the time required to effect the reorganisation of a database.

The applicant has determined that there is a marked variability in the time required by different individual operations (tasks) performed to effect a database reorganisation. For example, the creation of a new table may take less than one second, while transforming data from a table with a large number of records may take a number of hours.

In the prior art reorganisation methodologies which employ a multitasking environment to concurrently perform a number of operations, most of the less time-intensive operations will finish in a short space of time, leaving the more time-intensive operations which will take a long time to complete. The time taken to process the "leftover operations" should preferably be minimised.

The "leftovers" may be minimised by applying a methodology which comprises the steps of estimating the size and/or time of each operation in the database reorganisation set, and scheduling the operations so that the longest operation is started first, while other smaller operations are executed later in decreasing order of size.

Preferably, the number of operations which are active is equal to the number of available processors.

The abovementioned methodology allows for the preferential execution of more time intensive operations. The methodology also reduces any "slowdown" effects associated with attempting to process (multi-task) many database organisation operations simultaneously, whilst simultaneously handling a large number of less time-intensive operations in a controlled manner (so as to not slow down more time-intensive operations).

Use of the abovementioned methodology reduces the total reorganisation time in comparison with a simple multitasking approach, which would start all of the operations concurrently on a number of threads equal to the number of operations, rather than the number of central processing units Moreover, the effect of 'leftovers' is smaller.

In a third aspect, the present invention provides a computer program arranged, when loaded on a computing system, to implement a method in accordance with a first aspect of the invention.

In a fourth aspect, the present invention provides a computer readable medium providing a computer program in accordance with a third aspect of the invention.

DETAILED DESCRIPTION OF THE DRAWINGS

Features of the present invention will be presented in the description of any embodiment thereof, by way of example, with reference to the accompanying drawings, in which.

DESCRIPTION OF THE PREFERRED EMBODIMENT

Figure 1:
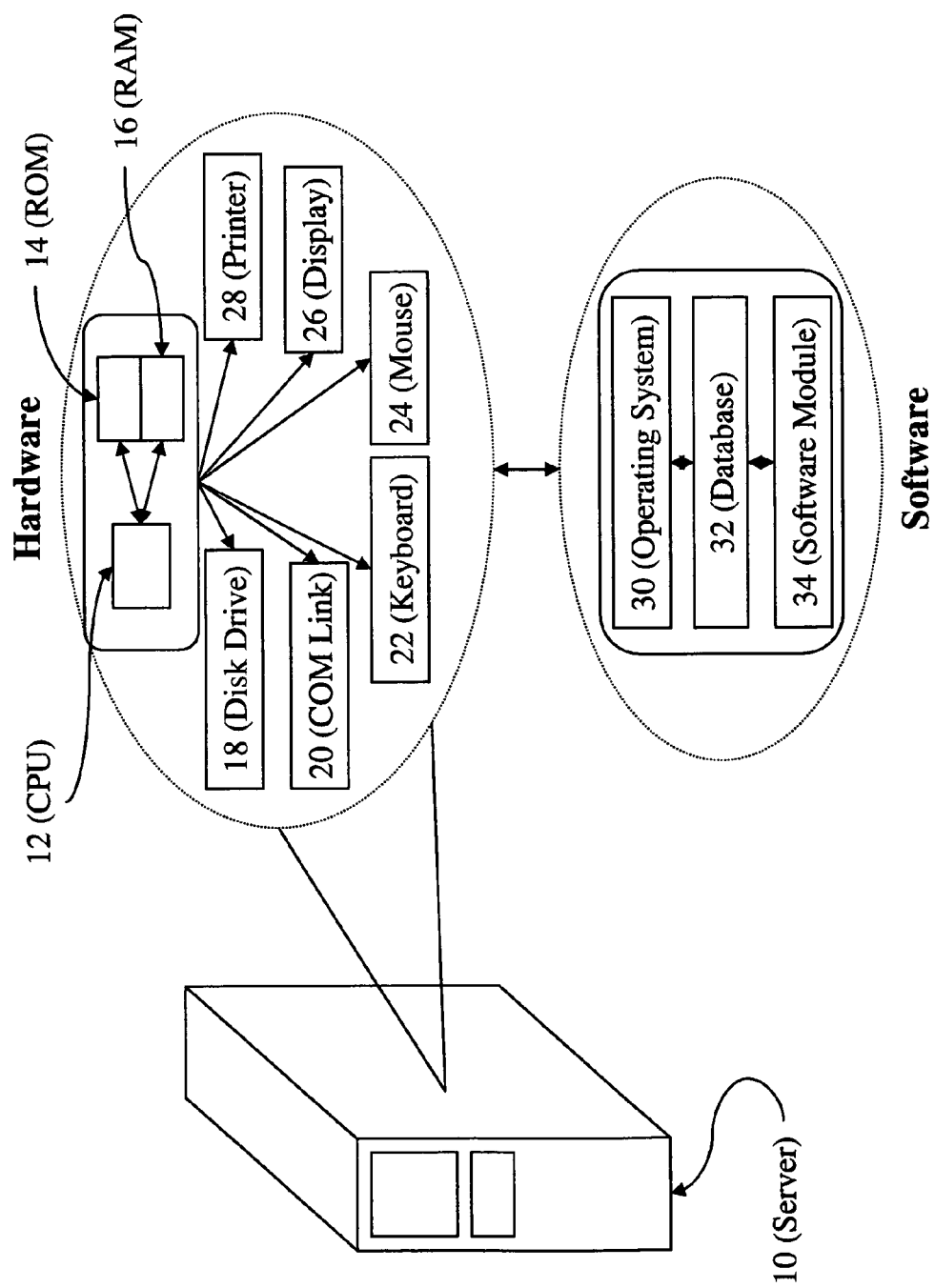
FIG. 1 illustrates a general purpose computer that may be used to implement the present invention.

At FIG. 1 there is shown an embodiment of the present invention as implemented in a computing system. At FIG. 1 there is shown a schematic diagram of a computing system 10 suitable for use with an embodiment of the present invention. The computing system 10 may be used to execute applications and/or system services such as deployment services in accordance with an embodiment of the present invention. The computing system 10 preferably comprises a processor 12, read-only memory (ROM) 14, random access memory (RAM) 16, and input/output devices such as disk drives 18, keyboard 22, mouse 24, display 26, printer 28. The computer includes programs that may be stored in RAM 16, ROM 14, or disk drives 18 and may be executed by the processor 12. A communications link 20 connects to a computer network but could be connected to a telephone line, an antenna, a gateway or any other type of communications link. Disk drives 18 may include any suitable storage media, such as, for example, floppy disk drives, hard disk drives, CD ROM drives or magnetic tape drives. The computing system 10 may use a single disk drive 18 or multiple disk drives. The computing system 10 may use any suitable operating systems 30, such as Windows™ or Unix™.

The system further comprises a database 32. The database may be any appropriate database, such as relational database or a hierarchal database. An embodiment of the present invention may be supplied as a software module 34 arranged to interact with the database to effect the reorganisation of the database.

An embodiment of the present invention seeks to reduce the elapsed time required to effect a database reorganisation.

One solution to attain the goal of minimising the database reorganisation time is to attempt to perform a number of the required reorganisation operations in parallel. Such an approach is not always possible—the reorganisation of one table may have to occur before the reorganisation of another table because any other methodology may result in the loss of information. Thus, there must be some restriction on the parallelization of reorganisation operations.

This problem may be solved by assigning one thread to each operation allowing the computing system to deal with scheduling and other "housekeeping processes". Such indiscriminate use of multitasking may overwhelm the number of available CPUs, resulting in a longer reorganisation time. Attempting to process many database tables at once results in contention issues on the input/output subsystem of the computing system, contention for the available CPUs, as well as operating system delays caused by the need to simultaneously schedule hundreds of threads.

"Contention" in the present context, refers to the situation where all threads are working at once, each thread processing the database reorganisation of one table say, begin to contend for CPU, memory, bus, disk, and other resources. For example, if 50 tables are to be reorganised, 50 threads are created, each thread to process the reorganisation of one table. However, if there are only 8 CPUs, all 50 threads will be contending with each other for the use of the 8 CPUs since only one thread can run on one CPU at one time. To reduce contention for CPUs, it is more efficient to create 8 threads, where each thread works with one CPU.

Therefore, crude multitasking is rarely an efficient solution when attempting to optimize database reorganisation time. Such a strategy may even be counter-productive, leading to a significant increase in the total reorganisation time.

The applicant has determined that there is a marked variability in the time required by different individual operations (tasks) in the database reorganisation set. For example, the creation of a new table may take less than one second, while transforming data from a table with a large number of records may take a number of hours. If all such operations are executed in parallel, less time-intensive operations will compete with more time intensive operations for input/output and CPU (central processing unit) access, resulting in a slow down for the more time intensive operations. In such a situation, most of the less time-intensive operations will finish in a short space of time, leaving the more time-intensive operations which will take a long time to complete. The time taken to process the "leftover operations" should preferably be minimised.

Therefore, in one embodiment of the invention, there is provided a method which comprises the steps of estimating the size and/or time of each operation in the database reorganisation set, and scheduling the operations so that the longest operation is started first, while other smaller operations are executed later in decreasing order of size.

The abovementioned methodology allows for the preferential execution of more time intensive operations.

The relative time intensity of an operation may be determined by any number of methods. In one embodiment of the present invention, the estimate of the time taken to perform an operation is assumed to be proportional to the number of rows in the table to be reorganised. That is, it is assumed that the greater the number of rows in a table, the greater the amount of time required to effect the table reorganisation. However, it will be understood that in other embodiments of the present invention, other mechanisms may be used to estimate or calculate the required reorganisation time.

The methodology also reduces any "slowdown" effects associated with attempting to process (multi-task) many database organisation operations simultaneously, whilst simultaneously handling a large number of less time intensive operations in a controlled manner (so as to not slow down more time intensive operations).

Use of the abovementioned methodology reduces the total reorganisation time in comparison with a simple multitasking approach. Moreover, the effect of 'leftovers' is smaller.

Furthermore, an embodiment of the methodology implements knowledge of the structure of dependencies between abstract entities and their mapping to the database to discover which operations are independent of each other so that they can be executed concurrently.

A number of abstract, higher-level application expressions may be mapped into a database in multiple ways. In addition, certain dependencies between abstract entities may be visible at the abstract level. These dependencies may not have an expression in the database.

Such knowledge can be used to establish a list of operations that are independent of each other and may be executed concurrently. That is, there is derived a list of operations which are more precise than a list based on only the database schema. For example, it may be unnecessary to reorganize 'conditional profiles' under certain conditions.

In EAE, a "Conditional Profile" table contains a subset of the data contained in the Ispec table. For example, if a CUSTOMER Ispec contains customer names, addresses, and postcodes, the PROMOAREAS Conditional Profile (containing the postcodes for the areas that need to be sent promotional materials) may contain only the postcodes column, and the rows in the table may be filtered by a condition such that only postcodes in the local area (say within 10 km) are included in the conditional profile.

Since Conditional Profiles are made up of a subset of data in the related Ispec, there are times when they do not need to be reorganised. For example, if the abovementioned Conditional Profile was altered so that it also contained the addresses of the customers. The filter condition may also be changed so that all addresses within 20 km are included in the Conditional Profile.

Such a change would necessitate the addition of a column, and the addition of more rows. However, the rows cannot be simply appended to the existing set of rows—rather, the rows need to be refreshed as a whole. Thus, the set of operations necessary to effect this change would be:

1. Add extra columns.
2. Populate the data in these new columns according to the original filter condition.
3. Change the filter condition.
4. Refresh all the data in all of the columns according to the new filter condition.

Step 2 in this logical sequence of steps is redundant and can be eliminated, since step 4 will refresh all data in all columns (including the new columns), according to the new filter condition, thus overwriting the data placed in the column in step 2. In this situation, step 2 can be removed, reducing the total time required to reorganise the database, without any ill effects. On the other hand, if the filter condition was not changed (thus removing steps 3 and 4 from the above example), step 2 would remain an essential step, to ensure that data integrity is maintained.

Thus, determining which operations should be performed on such elements (whether they should be included in the reorganisation set or not) requires implicit knowledge of the mapping—it cannot be achieved by knowing the database schema alone.

An example application of the present invention will now be described.

Figure 2:
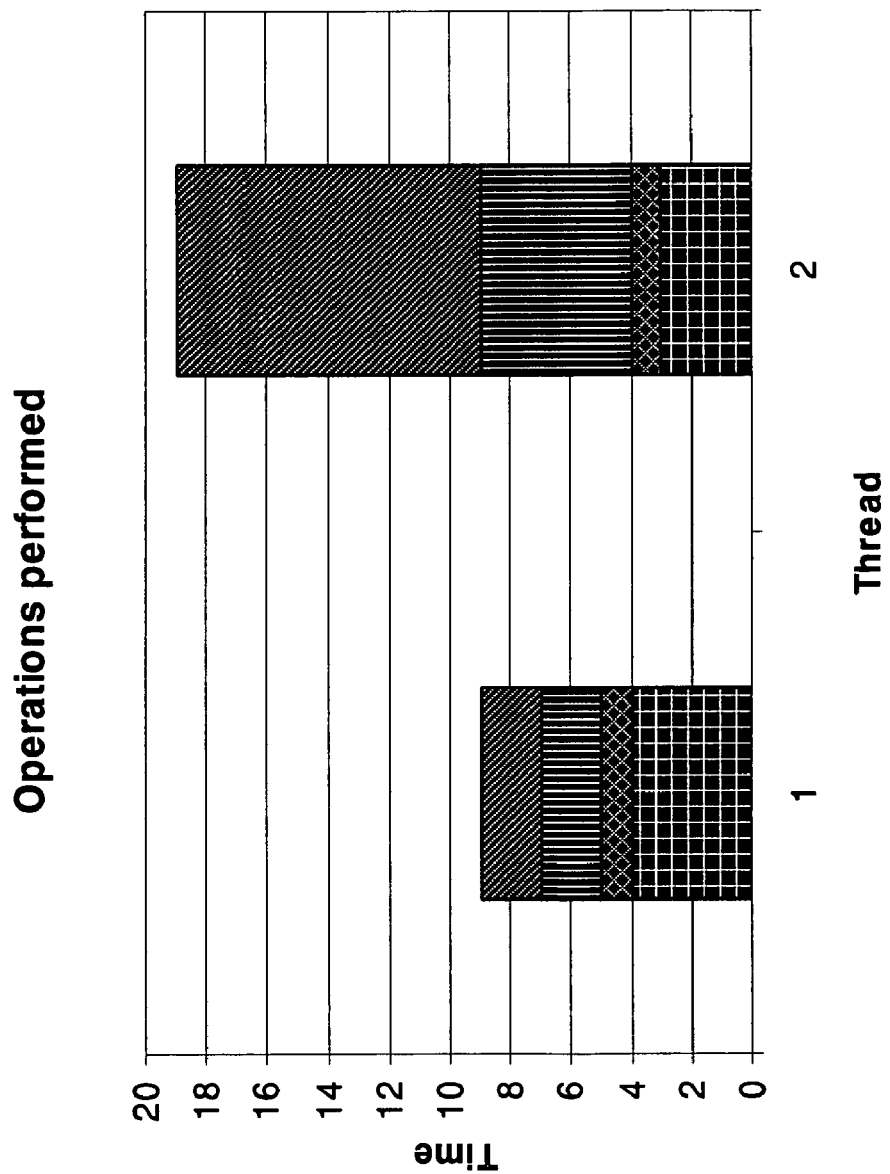
FIG. 2 is a table depicting the time taken to reorganise a database when the reorganisation operations are performed randomly.

In this example, the database reorganisation requires 8 operations in total. Furthermore, the sizes of these operations are (in time units) 10, 5, 4, 3, 2, 2, 1, 1. Note that the distribution of sizes given in the example is quite common in many real-world situations. That is, a small number of time-intensive operations, and many less time-intensive operations. In the example, there are two threads in which to execute the reorganisation operations. FIG. 2 shows the time and execution pattern for random order execution.

As can be seen from column 2 in FIG. 2, the higher the ratio of the longest to the shortest operation, the higher the "leftover". That is, thread one finishes its tasks, but thread two continues to execute for some time. Furthermore, in the example, the ratio of the longest to the shortest operation time is 10:1. In most practical cases the ratio will be higher, typically in the range of 100:1 or 1000:1.

An embodiment of the present invention assigns operations to threads based on the size of the task—the largest task is assigned to the first available thread in the following manner:

Time 0: task size 10 is assigned to thread 1, task size 5 assigned to thread 2

Time 5: thread 1 has not finished processing, but thread 2 becomes free, so task size 4 (the largest remaining task) is assigned to thread 2

Time 9: thread 1 has not finished processing, thread 2 becomes free, so task size 3 (the largest remaining) task is assigned to thread 2

Time 10: thread 1 has finished processing, so task size 2 (the largest remaining) is assigned to thread 1, whilst thread 2 is still processing Time 12: thread 1 and thread 2 have both finished processing, so task size 2 is assigned to thread 1, task size 1 is assigned to thread 2

Time 13: thread one has not finished processing, so the remaining task size 1 is assigned to thread 2

Time 14: both threads have finish processing

Figure 3:
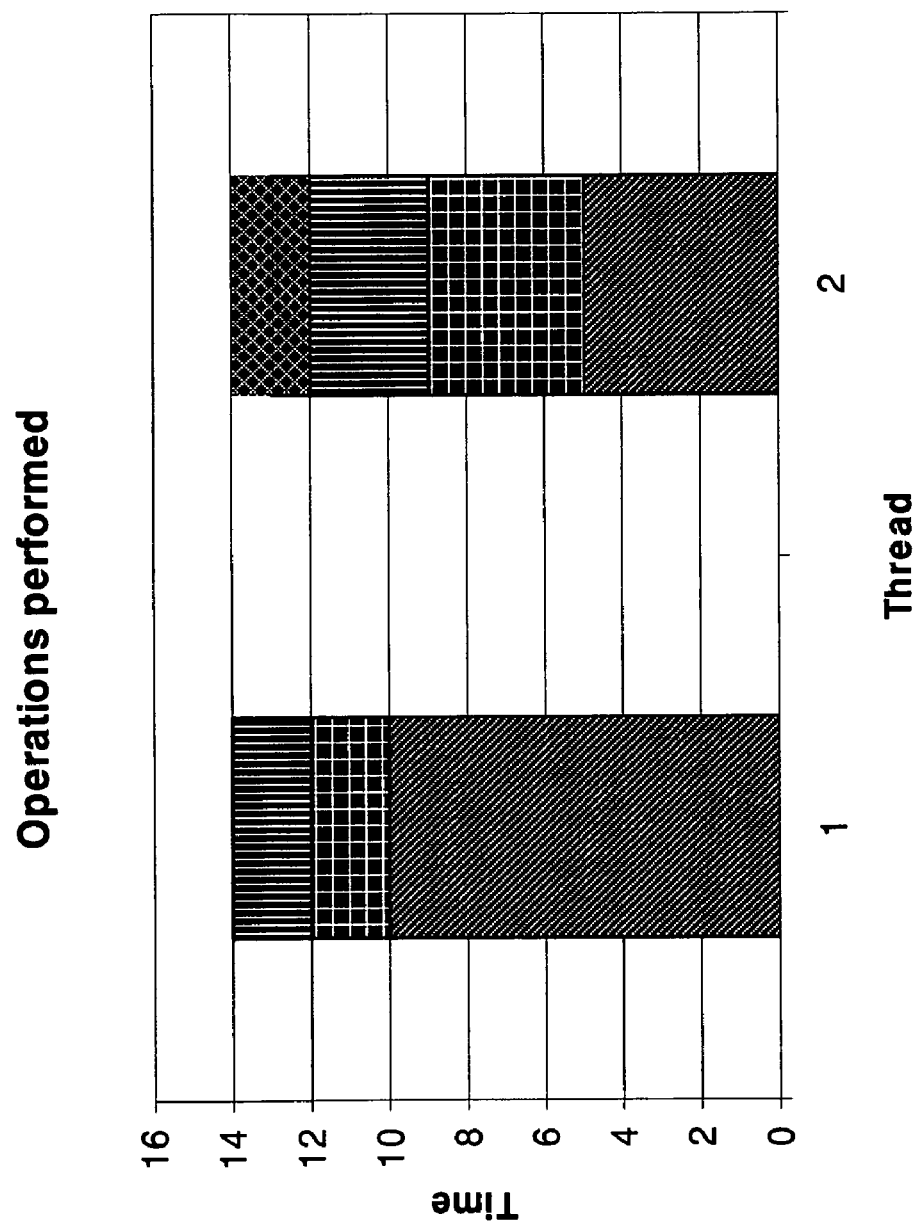
FIG. 3 is a table depicting the time taken to reorganise a database when the reorganisation operations are performed in accordance with an embodiment of the present invention.

The results are displayed in FIG. 3.

It is noted that, in general, there will not always be a 'no-leftovers' situation. Leftovers will be, on average, much lower than with a random execution order, since the largest tasks are completed first, so the remaining smaller tasks are easier to balance. Smaller "leftovers" result in a shorter execution time. In the example given the database reorganisation took 14 time units to complete when using an embodiment of a method of the present invention, whereas the reorganisation took 19 time units to complete when a prior art method was used.

Described herein is a method for the reorganisation of a database, wherein the reorganisation time is preferably reduced by estimating the required completion time for each task in a "series" of tasks which must be performed to effect the reorganisation, and scheduling each one of the tasks to be performed in the order of decreasing estimated completion time.

Whilst the described embodiment of the invention has been described with reference to $4^{th}$ generation programming languages and in particular to EAE, it will be understood that other embodiments of the present invention may be applied to any type of database reorganisation, irrespective of the type of database or the type of programming language, architecture or environment used to create or maintain the database.

Modifications and variations as would be apparent to a skilled addressee are deemed to be within the scope of the present invention.

The invention claimed is:

1. A system for effecting the reorganisation of a database in a computing system, comprising,
    (a) means for determining a plurality of operations necessary to effect the reorganisation of data elements in the database from one schema to another schema;
    (b) means for estimating the completion time for each one of said plurality of operations, said means including;
        (b1) means for determining the number of data elements within the database;
        (b2) means for deriving a proportional relationship between the number of data elements that must be reorganised and the total time required to complete the operation; and
    (c) means for scheduling each one of said plurality of operations to be executed in the order of decreasing estimated completion time, so that the longer completion times are executed before the shorter completion times.

2. A method for effecting the reorganisation of a database in a computing system, comprising,
    (a) means for determining a plurality of operations necessary to effect the reorganisation of data elements in the database from one schema to another schema;
    (b) means for estimating the completion time for each one of said plurality of operations, said means including;
        (b1) means for determining the number of data elements within the database;
        (b2) means for deriving a proportional relationship between the number of data elements that must be reorganised and the total time required to complete the operation; and (c) means for scheduling each one of said plurality of operations to be executed in the order of decreasing estimated completion time, so that the longer completion times are executed before the shorter completion times.

3. A computer program arranged, when loaded on the computing system, to implement the method of claim 2.

4. A computer readable medium providing the computer program in accordance with claim 3.

* * * * *